(12) United States Patent
Frazier et al.

(10) Patent No.: US 10,277,749 B2
(45) Date of Patent: Apr. 30, 2019

(54) MOBILE DEVICE CALL MANAGEMENT WITH MULTIPLE OVER-THE-TOP CALLS

(71) Applicant: Verizon Patent and Licensing Inc., Arlington, VA (US)

(72) Inventors: Kristopher T. Frazier, McKinney, TX (US); Lonnie Hiroshi Katai, Murphy, TX (US); Lin Song, Newton, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 34 days.

(21) Appl. No.: 15/471,049

(22) Filed: Mar. 28, 2017

(65) Prior Publication Data

US 2018/0288228 A1   Oct. 4, 2018

(51) Int. Cl.
*H04M 7/00* (2006.01)
*H04M 7/12* (2006.01)
*H04M 5/18* (2006.01)
*H04L 29/06* (2006.01)

(52) U.S. Cl.
CPC ........ *H04M 7/006* (2013.01); *H04L 65/1006* (2013.01); *H04L 65/1063* (2013.01); *H04M 5/18* (2013.01); *H04M 7/0075* (2013.01); *H04M 7/127* (2013.01)

(58) Field of Classification Search
CPC .... H04M 7/006; H04M 7/127; H04M 7/0075; H04L 65/1006; H04L 65/1063
See application file for complete search history.

(56) References Cited

U.S. PATENT DOCUMENTS

2014/0240440 A1*  8/2014  Seo .................. H04L 51/04
                                              348/14.03
2015/0281458 A1* 10/2015  Bianco ............ H04M 3/53366
                                                 370/259

* cited by examiner

*Primary Examiner* — Feben Haile

(57) ABSTRACT

A mobile device executes an operating system (OS) call manager and an over-the-top (OTT) calling application. The OTT calling application receives a notification for a first OTT call, and notifies the OS call manager of the first OTT call. The OS call manager assigns shared device resources of the mobile device to the first OTT call. The OTT calling application receives a notification for a second OTT call, and sends, to an OTT Telephony Application Server (TAS) without notifying the OS call manager of the second OTT call, a request to switch from the first OTT call to a second OTT call. The OTT calling app identifies the first OTT call as inactive and the second OTT call as active, and allocates the shared device resources assigned to the first OTT call to the second OTT call.

20 Claims, 17 Drawing Sheets

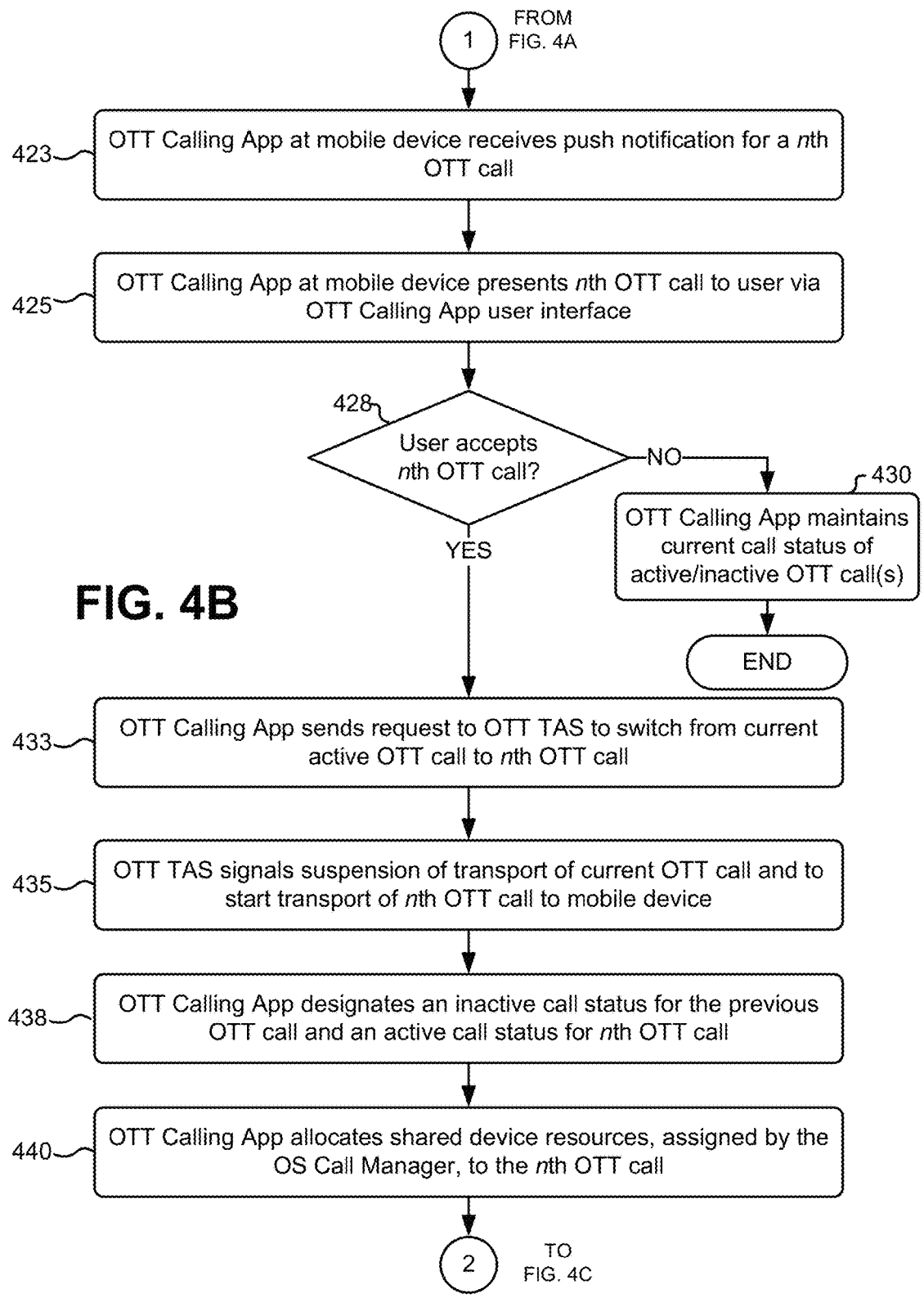

MOBILE DEVICE CALL MANAGEMENT WITH MULTIPLE OVER-THE-TOP CALLS

BACKGROUND

Over-the-top (OTT) services involve services that ride on top of an existing network service provided by a network operator, where the OTT services don't require any business or technology affiliations with the network operator. For example, televisions (TVs), Digital Video Disk (DVD) players and video game consoles are being built with wireless connectivity such that they can "piggyback" on an existing wireless network and pull content from the Internet. OTT services are likely to have a significant role in the proliferation of Internet television and Internet-connected TVs. OTT services may include audio, video, data, voice and other services.

The Internet Protocol (IP) multimedia subsystem (IMS), defined by the 3$^{rd}$ Generation Partnership Project (3GPP), is an architectural framework for implementing IP-based telephony and multimedia services. IMS defines a set of specifications that enables the convergence of voice, video, data and mobile technology over an all IP-based network infrastructure. In particular, the IMS fills the gap between the two most successful communication paradigms—cellular and Internet technology, by providing Internet services everywhere using cellular technology in a more efficient way. Session Initiation Protocol (SIP) is the main protocol for the IMS. SIP is an application layer control (signaling) protocol for creating, modifying and terminating sessions with one or more participants.

BRIEF DESCRIPTION OF THE DRAWINGS

FIGS. 4A-4C are flow diagrams illustrating an exemplary process for managing multiple incoming OTT calls at a called mobile device;

DETAILED DESCRIPTION OF THE PREFERRED EMBODIMENTS

The following detailed description refers to the accompanying drawings. The same reference numbers in different drawings may identify the same or similar elements. The following detailed description does not limit the invention.

Various OTT communications products exist in the marketplace. One problem OTT communications products encounter when executing within a mobile device environment is that they are normally treated as just another app, such as a web browser. As such, OTT communications products are often subject to interruptions by the operating system for tasks that the operating system treats as having a higher priority. For example, an ongoing OTT call (e.g., a Voice over Internet Protocol (VoIP) OTT call) being received by an OTT app at a mobile device will be interrupted by an incoming call to the mobile device's Mobile Directory Number, and in many cases the OTT call is immediately disconnected due to the operating system reassigning the shared device resources (e.g., microphone, speaker, touch screen interface) to the MDN call. From the mobile user's perspective, this loss of the OTT call is highly undesirable since the OTT call may be considered by the user to be as important, or more important, than the MDN call.

To remedy this OTT call and MDN call conflict problem within mobile devices, mobile providers have opened up access for OTT calling applications to register their calls with the operating system such that OTT calls have a same priority as MDN calls. However, in existing mobile devices, the operating system call manager typically limits concurrent calls to two calls, such as one OTT call and one MDN call. OTT calling applications, though, can be capable of supporting more than two concurrent OTT calls, creating problems between the OTT calling application and the operating system call manager which only supports two concurrent calls.

Exemplary embodiments described herein deploy a delegation model to resolve the problem of the operating system call manager only supporting two concurrent calls. In the delegation model, the OTT calling application reports only a single OTT call to the operating system call manager and internally manages any number of OTT calls greater than the single OTT call. The OTT calling application manages which of the multiple OTT calls is active, and puts the inactive OTT call(s) on-hold. In this delegation model, mobile device users use the operating system's user interface to swap between OTT calls and MDN calls, and the OTT calling application's user interface to swap between multiple OTT calls.

Figure 1:
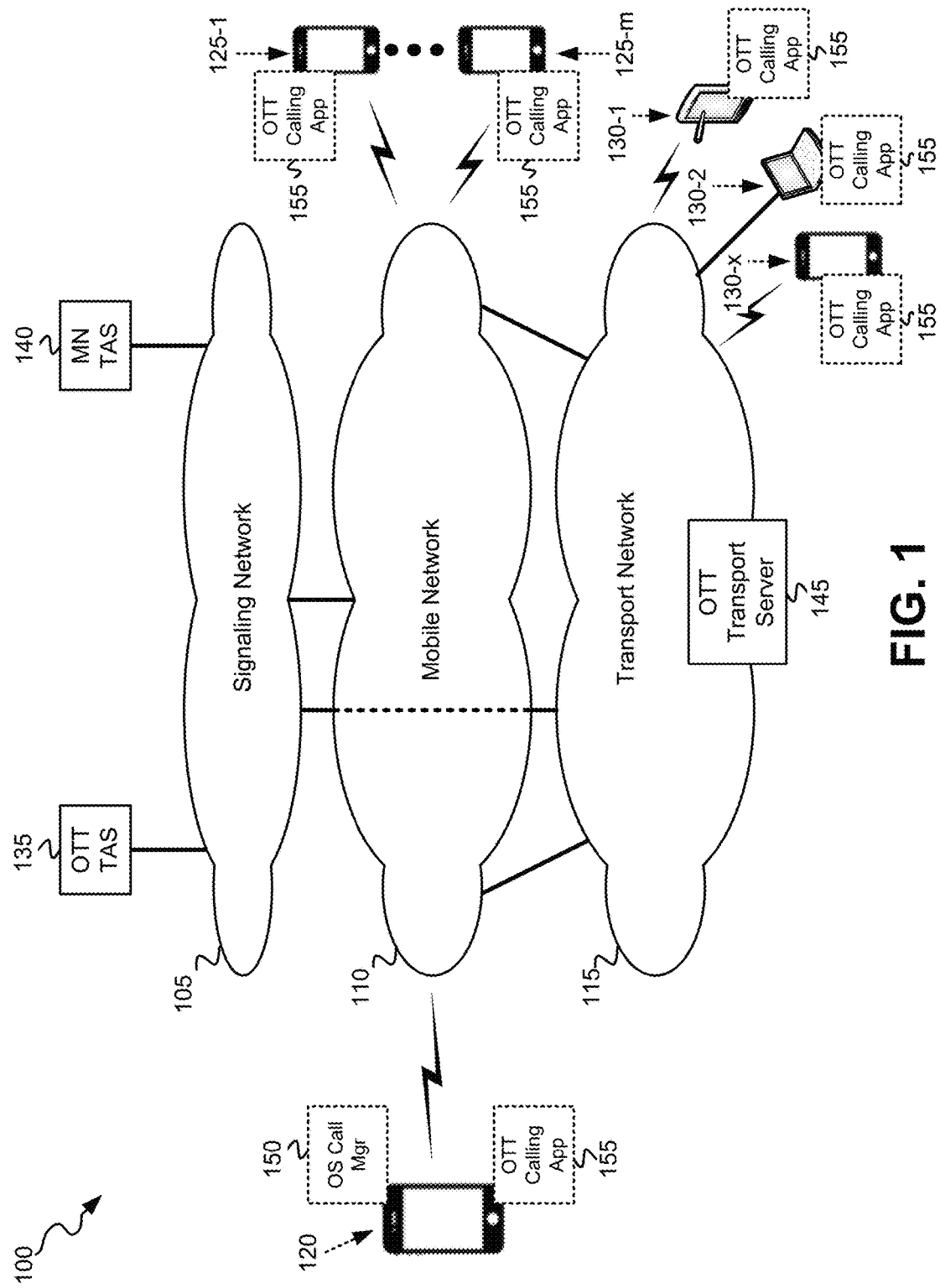
FIG. 1 is a diagram that illustrates an exemplary network environment in which multiple OTT calls to a mobile device, and calls to a mobile directory number of the mobile device, are managed.

FIG. 1 illustrates an exemplary network environment 100 in which multiple OTT calls to a mobile device, and calls to a mobile directory number (MDN) of the mobile device, are managed. Network environment 100 may include a signaling network 105, a mobile network 110, a transport network 115, a called mobile device 120, multiple calling mobile devices 125-1 through 125-m (where m is greater than or equal to one), and multiple calling OTT devices 130-1 through 130-x (where x is greater than or equal to one).

Signaling network 105 may include, for example, an IMS network that may use SIP for voice and multimedia session control. Signaling network 105 may connect to an OTT telephony application server (TAS) 135 and a mobile network (MN) TAS 140. OTT TAS 135 may include one or more network devices that perform functions related to OTT communication sessions. For example, OTT TAS 135 may control the activation or inactivation of OTT calls, including suspending the transport of OTT calls through transport network 115, and resuming the transport of OTT calls through transport network 115. MN TAS 140 may include one or more network devices that perform functions related to communication sessions through mobile network 110. Signaling network 105 may include additional signaling components, not shown in FIG. 1, as described with respect to FIG. 2 below.

Mobile network 110 may include a wireless Public Land Mobile Network (PLMN) or a satellite network. The wireless PLMN may include a Code Division Multiple Access (CDMA) 2000 PLMN, a Global System for Mobile Communications (GSM) PLMN, a Long Term Evolution (LTE) PLMN and/or other types of PLMNs. Mobile network 110 may wirelessly connect to called mobile device 120 and calling mobile devices 125-1 through 125-$m$. Mobile network 110 may additionally connect to signaling network 105 and transport network 115 via wired or wireless links.

Transport network 115 may include one or more networks of any type that transport OTT calls from a source OTT calling app to a destination OTT calling app. Transport network 115 may include, for example, a local area network (LAN), a wide area network (WAN), a metropolitan area network (MAN), a cable network, a Public Switched Telephone Network (PSTN), an intranet, and/or the Internet. Transport network 115 may implement circuit-switched or packet-switched telephony. The packet-switched telephony may include Internet Protocol (IP) based telephony (e.g., VoIP). As shown, transport network 115 may include at least one OTT transport server 145. OTT transport server 145 may route OTT call traffic from an OTT call source (e.g., calling mobile device 125) to an OTT call destination (e.g., called mobile device 120).

Called mobile device 120 may include any type of electronic device that may send/receive OTT calls and send/receive mobile network calls from/to a mobile directory number (MDN) associated with mobile device 120 within mobile network 110. Called mobile device 120 may include, for example, a telephone (land-line or mobile), a personal digital assistant (PDA), a vehicular communication system, or a computer (e.g., tablet, palmtop, or laptop). In one embodiment, called mobile device 120 may include a "smart" mobile phone. Called mobile device 120 further has an Operating System (OS) call manager 150 and an OTT calling app 155. OS call manager 150 includes executable OS software that may manage MDN calls and an OTT call received at called mobile device 120. OTT calling app 155 may include executable app software that manages multiple OTT calls received at called mobile device 120 in a manner that is transparent to OS call manager 150. In one exemplary implementation, OS call manager 150 may include Apple's "Call Kit," or a similar OS application. In another exemplary implementation, OTT calling app 155 may include Verizon's "OneTalk" OTT calling app, or a similar OTT calling app.

Calling mobile devices 125-1 through 125-$m$ may each include any type of electronic device that may send/receive OTT calls via mobile network 110 and transport network 115, and may send/receive mobile network calls from/to a mobile directory number (MDN) associated with mobile device 120 or mobile devices 125 within mobile network 110. Calling mobile devices 125 may each include, for example, a telephone (land-line or mobile), a personal digital assistant (PDA), or a computer (e.g., tablet, desktop, palmtop, or laptop). In one embodiment, some of calling mobile devices 125 may include a "smart" mobile phone.

Calling OTT devices 130-1 through 130-$x$ may each include any type of electronic device that that may send/receive OTT calls via transport network 115. Calling OTT devices 130 may connect to transport network 115 via wired or wireless links (e.g., Wi-Fi links). As shown, each of calling OTT devices 130 further has an OTT calling app 155 for use in sending or receiving an OTT call via transport network 115.

The configuration of network components of network environment 100 shown in FIG. 1 is for illustrative purposes. Other configurations may be implemented. Therefore, network environment 100 may include additional, fewer and/or different components that may be configured in a different arrangement than that depicted in FIG. 1.

Figure 2:
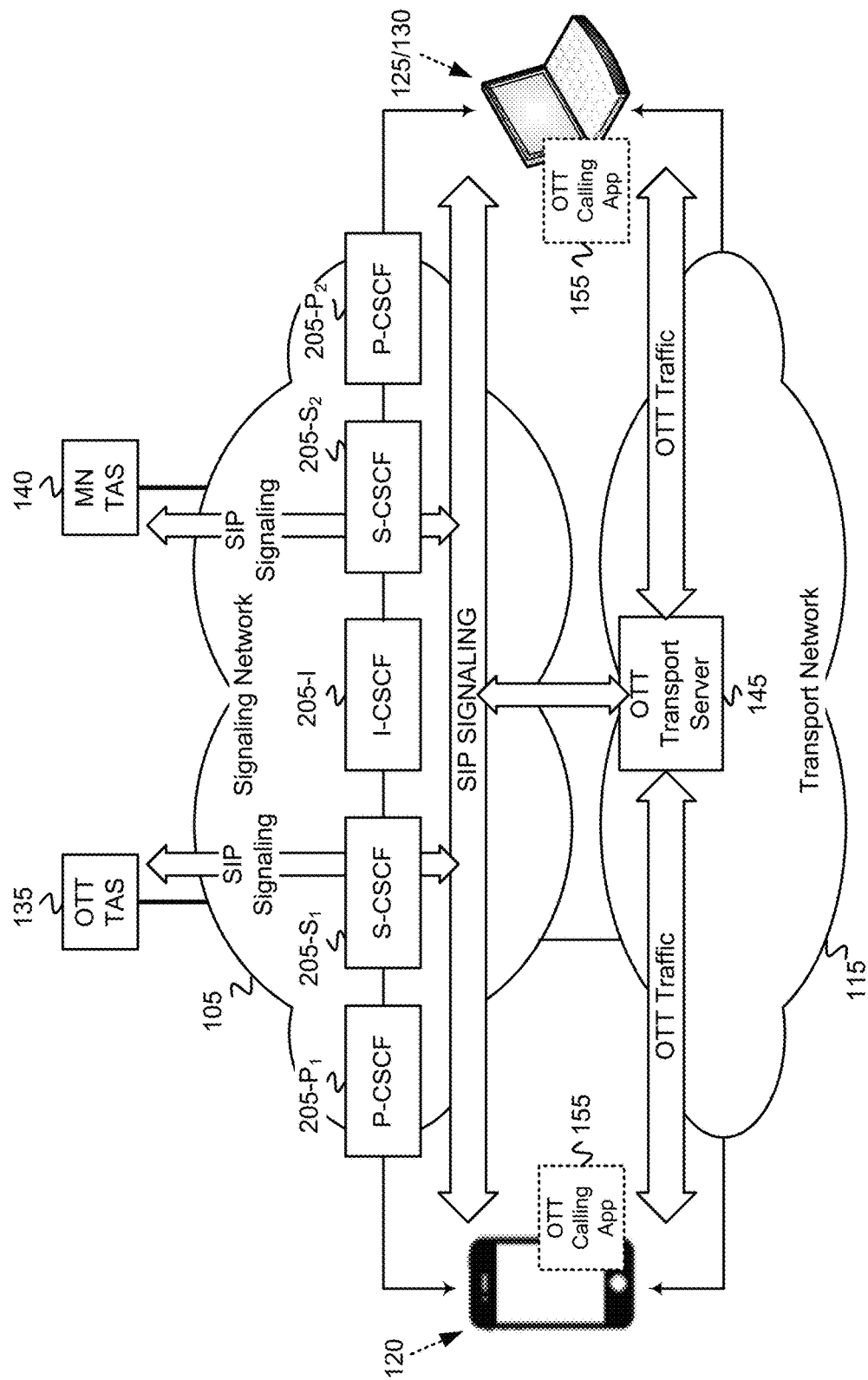
FIG. 2 is a diagram that depicts an overview of the use of SIP signaling for controlling the transmission of OTT traffic associated with an OTT call between a calling device and a called mobile device.

FIG. 2 is a diagram that depicts an overview of the use of SIP signaling for controlling the transmission of OTT traffic associated with an OTT call session between calling device 125/130 and called mobile device 120. FIG. 2 further depicts exemplary components of signaling network 105 that may used for SIP signaling associated with the OTT call session.

As shown in FIG. 2, signaling network 105 may include a Proxy Call Session Control Function (P-CSCF) 205-$P_1$, a serving CSCF (S-CSCF) 205-$S_1$, an Interrogating CSCF (I-CSCF) 205-I, a S-CSCF 205-$S_2$, and a P-CSCF 205-$P_2$. P-CSCF 205-$P_1$, S-CSCF 205-$S_1$, I-CSCF 205-I, S-CSCF 205-$S_2$, and P-CSCF 205-$P_2$ may be generically and individually referred to herein as "CSCF 205". P-CSCF 205-$P_1$ acts as an edge of the IMS network through which calling mobile devices 125/130 and called mobile device 120 obtain access. P-CSCF 205-$P_1$ maintains an awareness of all IMS endpoints (including devices 120, 125 and 130) that are currently registered with the IMS network, and performs various manipulations of SIP signaling messages that are arriving from, or being sent to, the IMS endpoints that are registered with S-CSCF 205-$S_1$. P-CSCF 205-$P_1$ maintains a connection with S-CSCF 205-$S_1$ for called mobile device 120.

S-CSCF 205-$S_1$ processes all originating and terminating SIP requests and responses associated with endpoints registered with S-CSCF 205-$S_1$ (including called mobile device 120-1). S-CSCF 205-$S_1$ routes the SIP signaling towards its destination (e.g., towards called mobile device 120 via P-CSCF 205-$P_1$, towards I-CSCF 205 for destination device 125/130, or towards OTT transport server 145). S-CSCF 205 may route the SIP signaling request to the application server (e.g., OTT TAS 135 or MN TAS 140) for further processing.

I-CSCF 205-I passes SIP signaling to/from S-CSCF 205-$S_1$ and S-CSCF 205-$S_2$. I-CSCF 205-I queries a Home Subscriber Server (HSS) (not shown) using diameter signaling to learn the identity of the S-CSCF assigned to a given device (e.g., called mobile device 120) so that it can properly forward the SIP signaling.

S-CSCF 205-$S_2$ processes all originating and terminating SIP requests and responses associated with endpoints registered with S-CSCF 205-$S_2$ (including device 125/130). S-CSCF 205-$S_2$ routes the SIP signaling towards its destination (e.g., towards device 125/130 via P-CSCF 205-$P_2$ or towards called mobile device 120 via I-CSCF 205-I or S-CSCF P-CSCF 205-$P_2$ acts as an edge of the IMS network through which device 125/130 obtains access. P-CSCF 205-$P_2$ maintains an awareness of all IMS endpoints (including device 125/130) that are currently registered with the IMS network, and performs various manipulations of SIP signaling messages that are arriving from, or being sent to, the IMS endpoints (e.g., device 125/130) that are registered with S-CSCF 205-S₂. P-CSCF 205-P₂ maintains a connection with S-CSCF 205-S₂ for device 125/130.

As shown in FIG. 2, OTT TAS 135 may engage in SIP signaling via signaling network 105, including sending SIP signaling to S-CSCF 205-S1, which forwards the signaling to OTT transport server 145 for sending instructions regarding transport of OTT traffic between device 125/130 and mobile device 120. Additionally, FIG. 2 depicts OTT transport server 145 engaging in SIP signaling, via signaling network 105, to send notifications to OTT TAS 135. The notifications may include, for example, notifications related to an OTT session between device 125/130 and mobile device 120. FIG. 2 further depicts OTT traffic, associated with one or more OTT sessions, sent from device 125/130 to mobile device 120, and from mobile device 120 to device 125/130, with OTT transport server 145 acting as a transport router. OTT traffic, from device 125/130 may be routed by OTT transport server 145 to reach its destination called mobile device 120 across transport network 115. Signaling network 105, therefore, serves as the signaling medium for establishing, suspending, resuming and terminating OTT sessions between device 125/130 and mobile device 120, and transport network 115 serves as the transport medium for transporting OTT traffic between device 125/130 and mobile device 120, with OTT transport server 145 serving as the transport router for routing OTT traffic from a source to a destination.

The configuration of network components of signaling network 105 and transport network 115 shown in FIG. 2 is for illustrative purposes. Other configurations may be implemented. Therefore, signaling network 105 and/or transport network 115 may include additional, fewer and/or different components that may be configured in a different arrangement than that depicted in FIG. 2.

Figure 3:
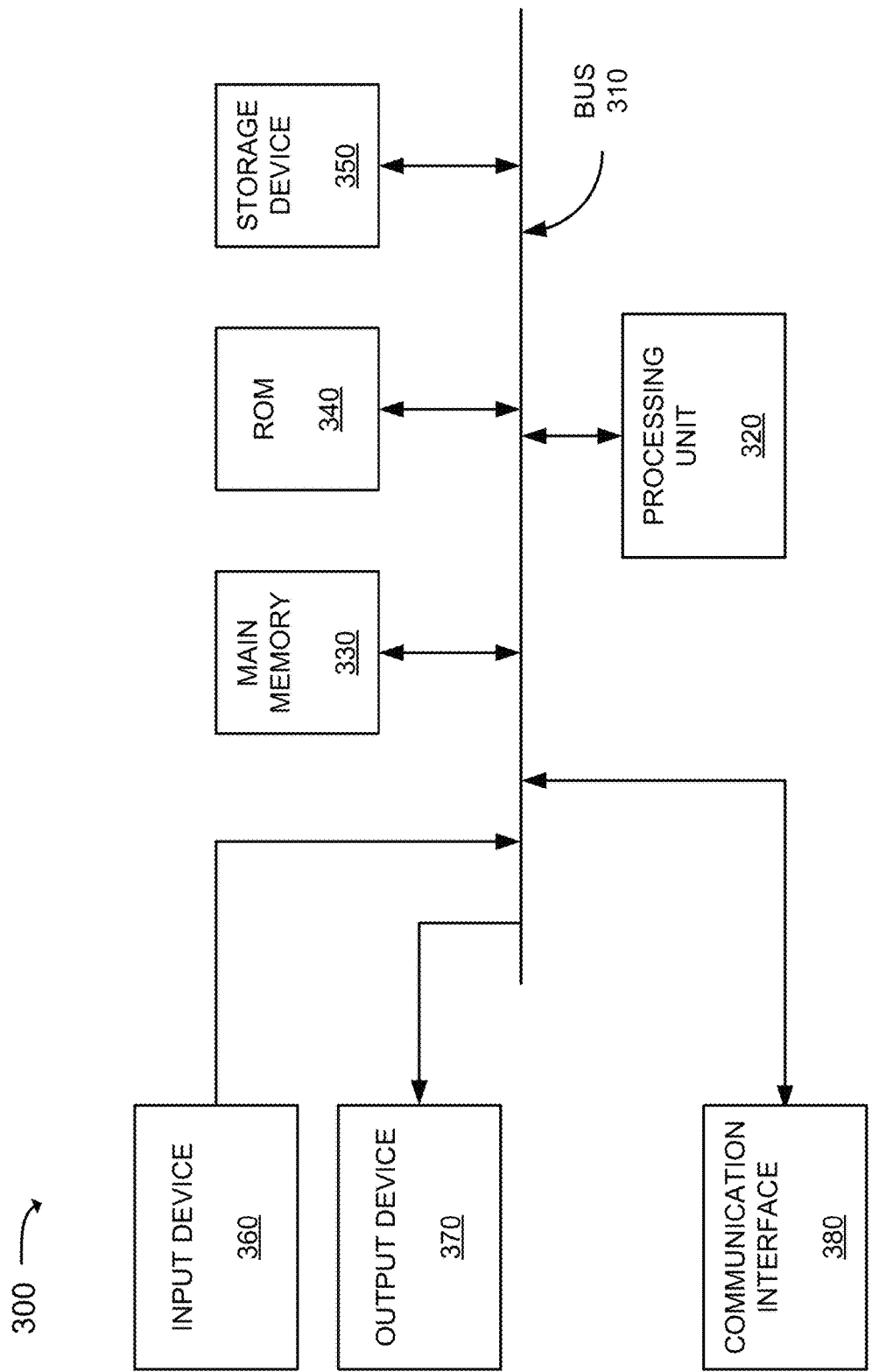
FIG. 3 is a diagram that depicts exemplary components of a device that may correspond to the mobile devices, OTT devices, OTT Telephony Application Server, mobile network Telephony Application Server, OTT transport server, and call session control function of FIGS. 1 and 2.

FIG. 3 is a diagram that depicts exemplary components of a device 300. Mobile devices 120 and 125, OTT devices 130, OTT TAS 135, MN TAS 140, OTT transport server 145, and CSCF 205 may each be similarly configured to device 300. Device 300 may include a bus 310, a processing unit 320, a main memory 330, a read only memory (ROM) 340, a storage device 350, an input device 360, an output device 370, and a communication interface 380. Bus 310 may include a path that permits communication among the components of device 300.

Processing unit 320 may include one or more processors or microprocessors, or processing logic, which may interpret and execute instructions. Main memory 330 may include a random access memory (RAM) or another type of dynamic storage device that may store information and instructions for execution by processing unit 320. ROM 340 may include a ROM device or another type of static storage device that may store static information and instructions for use by processing unit 320. Storage device 350 may include a magnetic and/or optical recording medium. Main memory 330, ROM 340 and storage device 350 may each be referred to herein as a "tangible non-transitory computer-readable medium." The process/methods set forth herein can be implemented as instructions that are stored in main memory 330, ROM 340 and/or storage device 350 for execution by processing unit 320. For example, OS call manager 150 and/or OTT calling app 155 may be implemented as instructions that are stored in main memory 330, ROM 340 and/or storage device 350 for execution by processing unit 320.

The software instructions may be read into memory 330 from another computer-readable medium, such as storage device 350, or from another device via communication interface 380. The software instructions contained in main memory 330 may cause processing unit 320 to perform operations or processes that will be described later. Alternatively, hardwired circuitry may be used in place of or in combination with software instructions to implement processes consistent with the principles of the invention. Thus, exemplary implementations are not limited to any specific combination of hardware circuitry and software.

Input device 360 may include one or more mechanisms that permit an operator to input information to device 300, such as, for example, a keypad or a keyboard, a display with a touch sensitive panel, voice recognition and/or biometric mechanisms, etc. Output device 370 may include one or more mechanisms that output information to the operator, including a display, a speaker, etc. Input device 360 and output device 370 may, in some implementations, be implemented as a user interface (UI) that displays UI information and which receives user input via the UI (e.g., a graphical touch screen user interface). Communication interface 380 may include one or more transceivers that enable device 300 to communicate with other devices and/or systems. For example, communication interface 380 may include wired and/or wireless transceivers for communicating via signaling network 105, mobile network 110, and/or transport network 115.

The configuration of components of device 300 illustrated in FIG. 3 is for illustrative purposes. Other configurations may be implemented. Therefore, device 300 may include additional, fewer and/or different components than those depicted in FIG. 3.

Figure 4A:
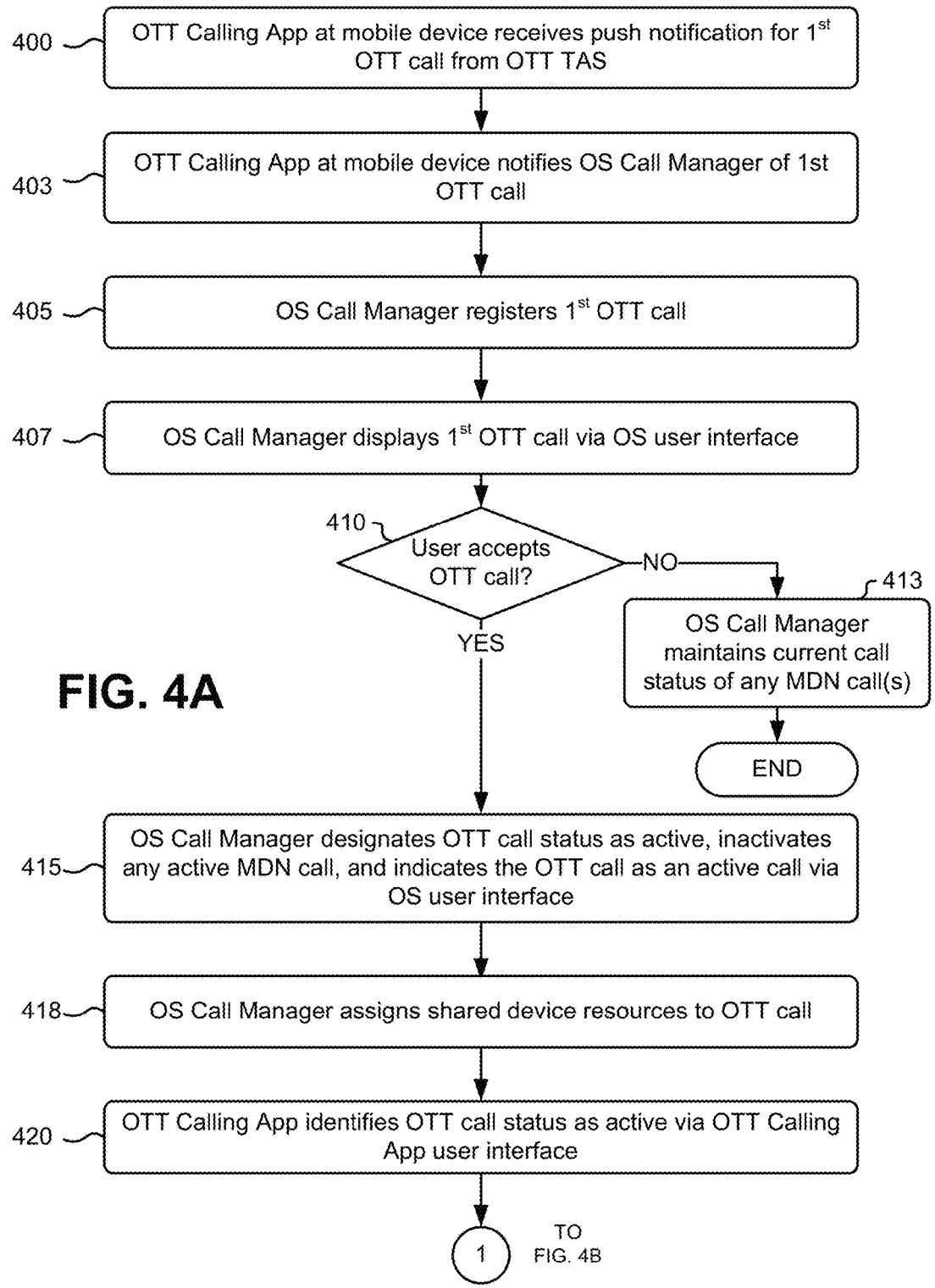
Figure 4C:
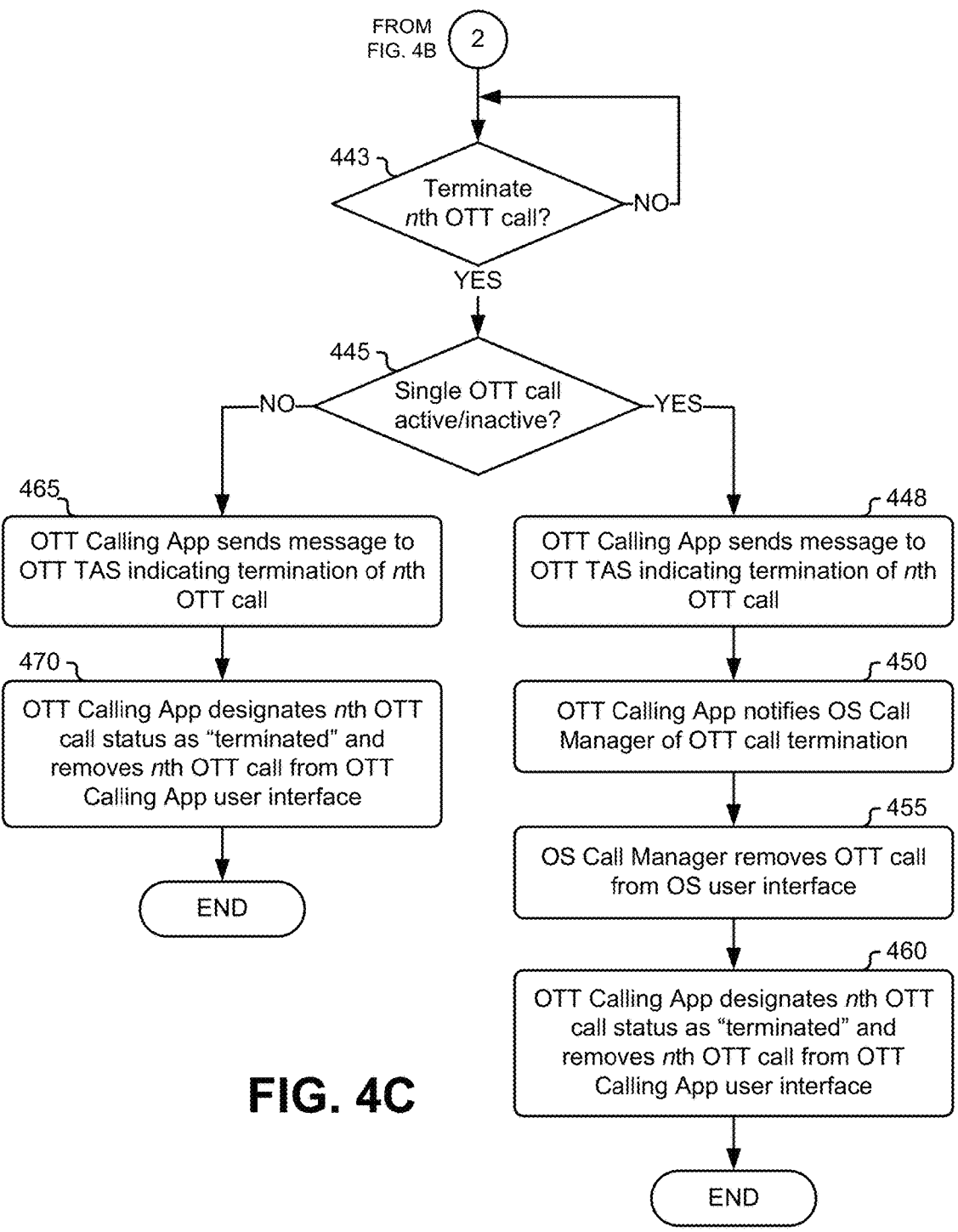

FIGS. 4A-4C are flow diagrams illustrating an exemplary process for managing multiple incoming OTT calls at a called mobile device 120. The exemplary process of FIGS. 4A-4C may be performed by processing unit 320 (e.g., executing OS call manager 150 and OTT calling app 155) and communication interface 380 of called mobile device 120 in conjunction with OTT TAS 135. The exemplary process of FIGS. 4A-4C is described herein with reference to the messaging diagrams of FIGS. 5A-5C.

Figure 5A:
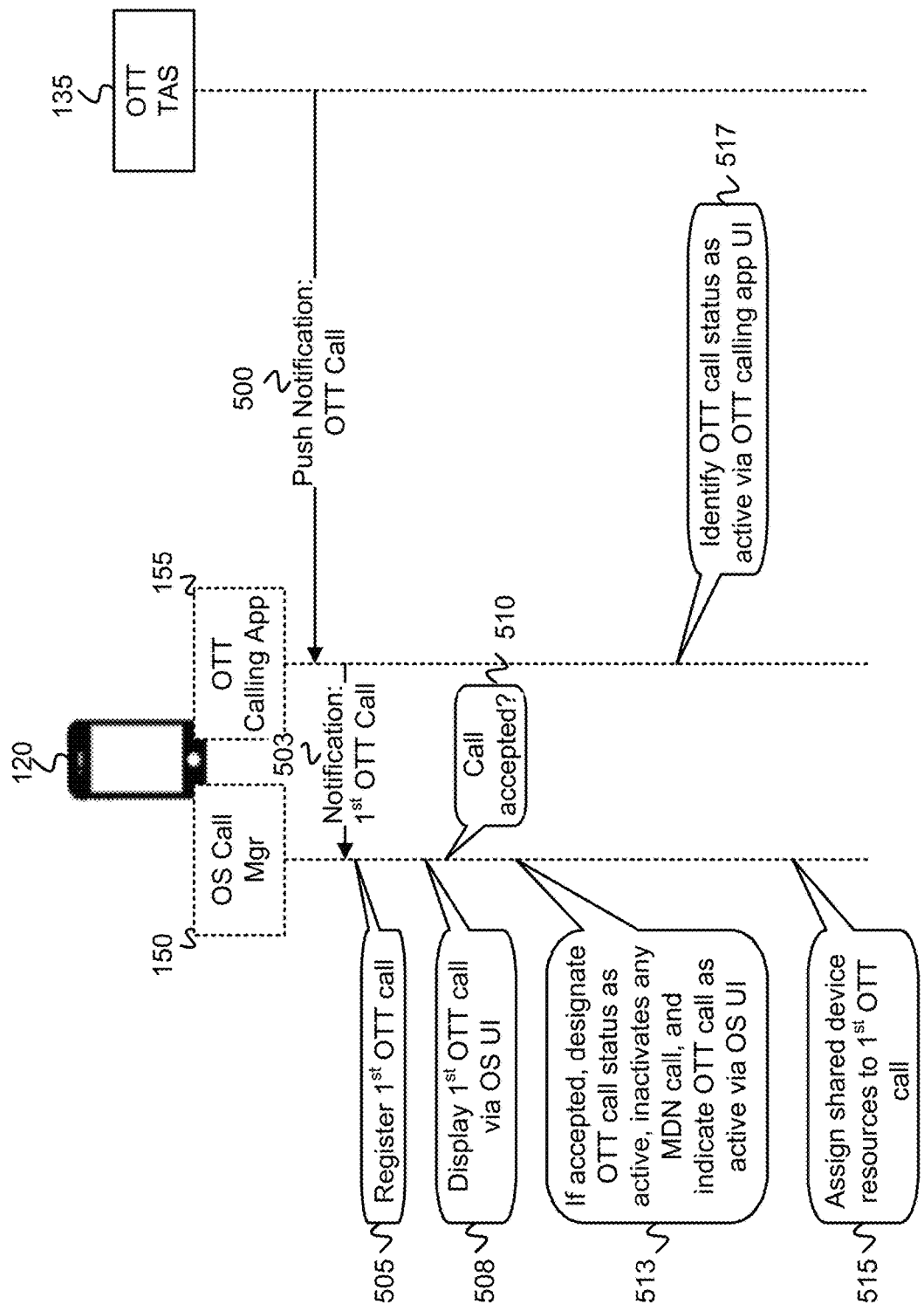
FIGS. 5A-5C are exemplary messaging diagrams associated with the exemplary process of FIGS. 4A-4C.

The exemplary process may include OTT calling app 155 at called mobile device 120 receiving a push notification for a first OTT call from OTT TAS 135 (block 400). A calling mobile device 125 or calling OTT device 130 may initiate an OTT call, via an OTT calling app 155, to called mobile device 120. OTT TAS 135 may receive a call request associated with the OTT call, and send a push notification for the OTT call to OTT calling app 155 at called mobile device 120. OTT TAS 135 may send the push notification for the OTT call via, for example, signaling network 105, and mobile network 110, for receipt at called mobile device 120. FIG. 5A depicts OTT TAS 135 sending a push notification 500 to OTT calling app 155 at mobile device 120 to notify device 120 of an incoming OTT call. OTT calling app 155 at called mobile device 120, upon receipt of the push notification, notifies OS call manager 150 of the OTT call (block 403). As shown in FIG. 5A, OTT calling app 155 sends an internal notification 503 to OS call manager 150 to notify OS call manager 150 of the incoming OTT call. OS call manager 150 registers the first OTT call (block 405) and displays the first OTT call via the OS user interface (block 407). OS call manager 150, within its call status management functionality, registers the new OTT call, and designates it as an active call. Additionally, OS call manager 150 inactivates (e.g., places on hold) any currently active MDN call when the user accepts the incoming OTT call. To inactivate a MDN call, OS call manager 150 may send a message to MN TAS 140 requesting the MDN call to be inactivated. FIG. 5A depicts OS call manager 150 registering 505 the OTT call, and displaying 508 the OTT call via the OS user interface.

Figure 6:
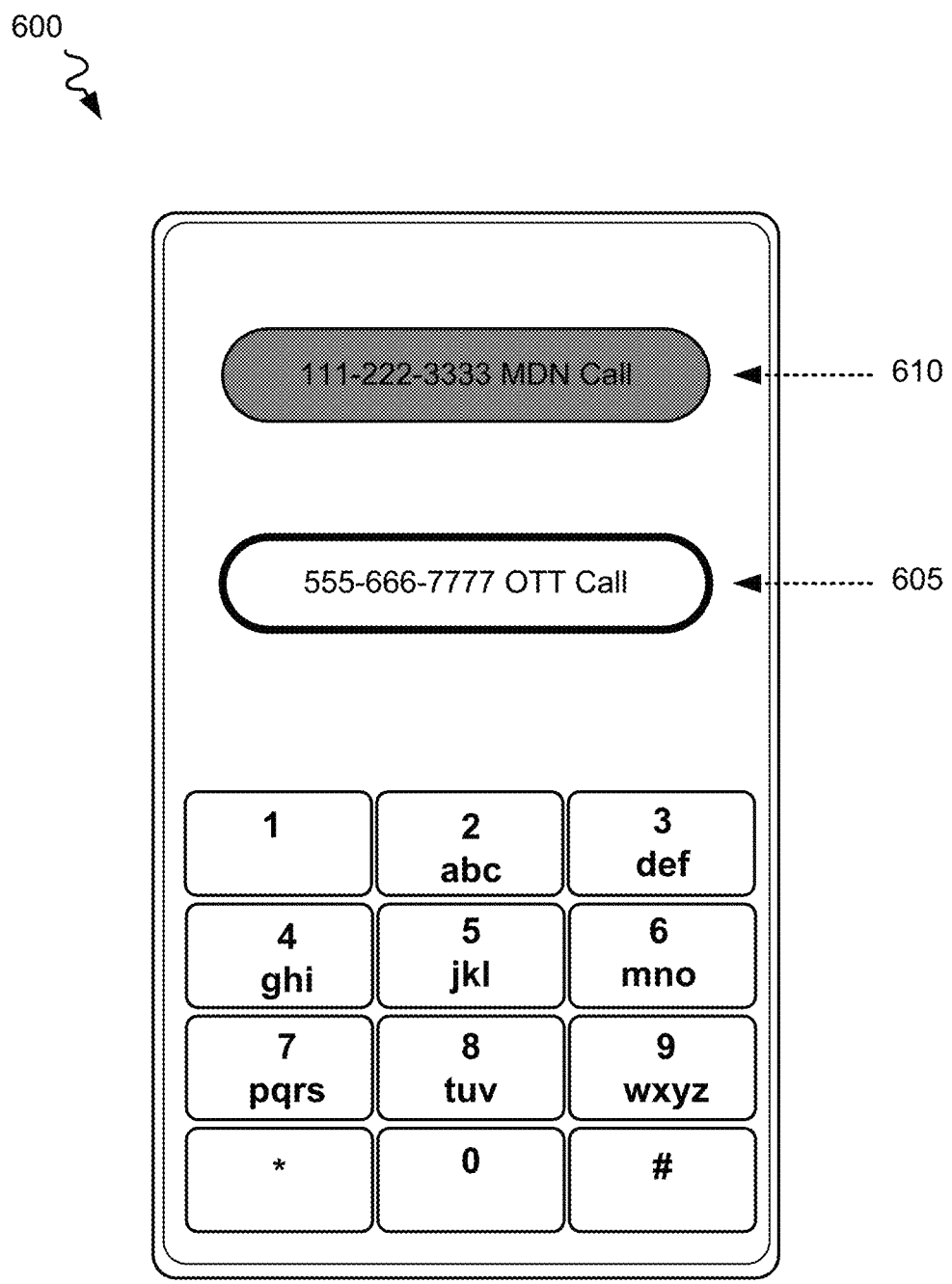
FIG. 6 is a diagram depicting an exemplary Operating System user interface associated with managing mobile directory number calls and OTT calls at a called mobile device.

OS call manager 150 determines if the user of called mobile device 120 accepts the OTT call (block 410). Various techniques may be used by the user at mobile device 120 to accept the OTT call including, for example, pressing an "answer" button upon a touch screen of the OS user interface of mobile device 120, shaking mobile device 120 to cause the OTT call to be answered, or performing a sliding motion upon a button of the touch screen of the OS user interface of mobile device 120 to cause the OTT call to be answered. Other techniques or inputs may be used for determining if the user of mobile device 120 accepts the incoming OTT call. If the user does not accept the OTT call (NO—block 410), then OS call manager 150 maintains the current call status of any MDN call(s) (block 413). If there is currently an active (i.e., ongoing) and/or inactive (e.g., on-hold) MDN call(s), then OS call manager 150 maintains the active or inactive status of the MDN call(s). If, however, the user accepts the incoming OTT call (YES—block 415), then OS call manager 150 designates the OTT call status as active, inactivates any active MDN call, and indicates the OTT call as an active call via the OS user interface (block 415). FIG. 6 depicts an example of the OS user interface 600 of mobile device 120 where a touch screen is a component of OS user interface 600. As shown, the OTT call is represented by a highlighted icon 605 that includes a descriptor (e.g., phone number) for the OTT call and a visual indication that the call is active (e.g., a bright color), and the MDN call is represented by an icon 610 that includes a descriptor for the MDN call and a visual indication that the call is inactive (e.g., darkened color). Referring back to FIG. 5A, OS call manager 150 determines 510 if the call is accepted, and if accepted, OS call manager 150 designates 513 the OTT call status as active, inactivates any MDN call, and indicates the OTT call as active via the OS user interface.

Figure 7A:
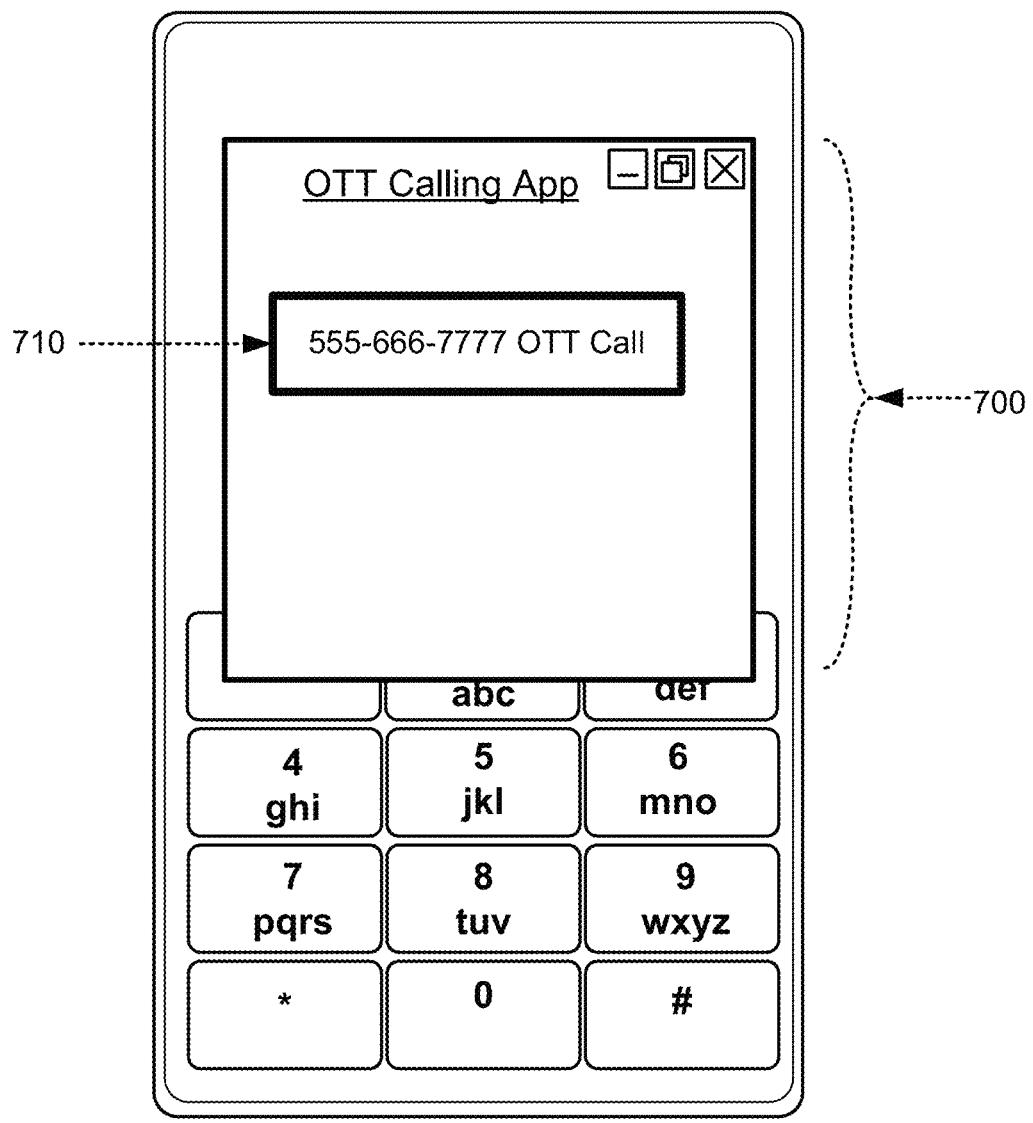
FIGS. 7A-7C are diagrams depicting exemplary OTT calling app user interfaces associated with managing incoming OTT calls at a called mobile device.

OS call manager 150 assigns shared device resources to the OTT call (block 418). The shared device resources of mobile device 120 may include the speaker(s), microphone(s), camera(s), and/or touch screen display of mobile device 120. The shared device resources of mobile device 120 may additionally other resources (e.g., communication interface) not described above. Assignment of the shared device resources to the OTT call may, for example, preclude any MDN call from using the assigned shared device resources. FIG. 5A depicts OS call manager 150 assigning 515 the shared device resources to the OTT call. OTT calling app 155 identifies the OTT call status as active via the OTT calling app user interface (block 420). As shown in FIG. 7A, the OTT call is represented by a highlighted icon 710, within OTT calling app user interface 700, that includes a descriptor for the OTT call and a visual indication that the call is active (e.g., a highlighted or bright color). OTT calling app user interface 700 includes a separate user interface, from the OS user interface, that maintains indications of call status for OTT calls, but may not maintain indications of status for MDN calls that are managed by OS call manager 150. Referring back to FIG. 5A, OTT calling app 155 is shown identifying 517 the OTT call status as active via the OTT calling app user interface.

Figure 5B:
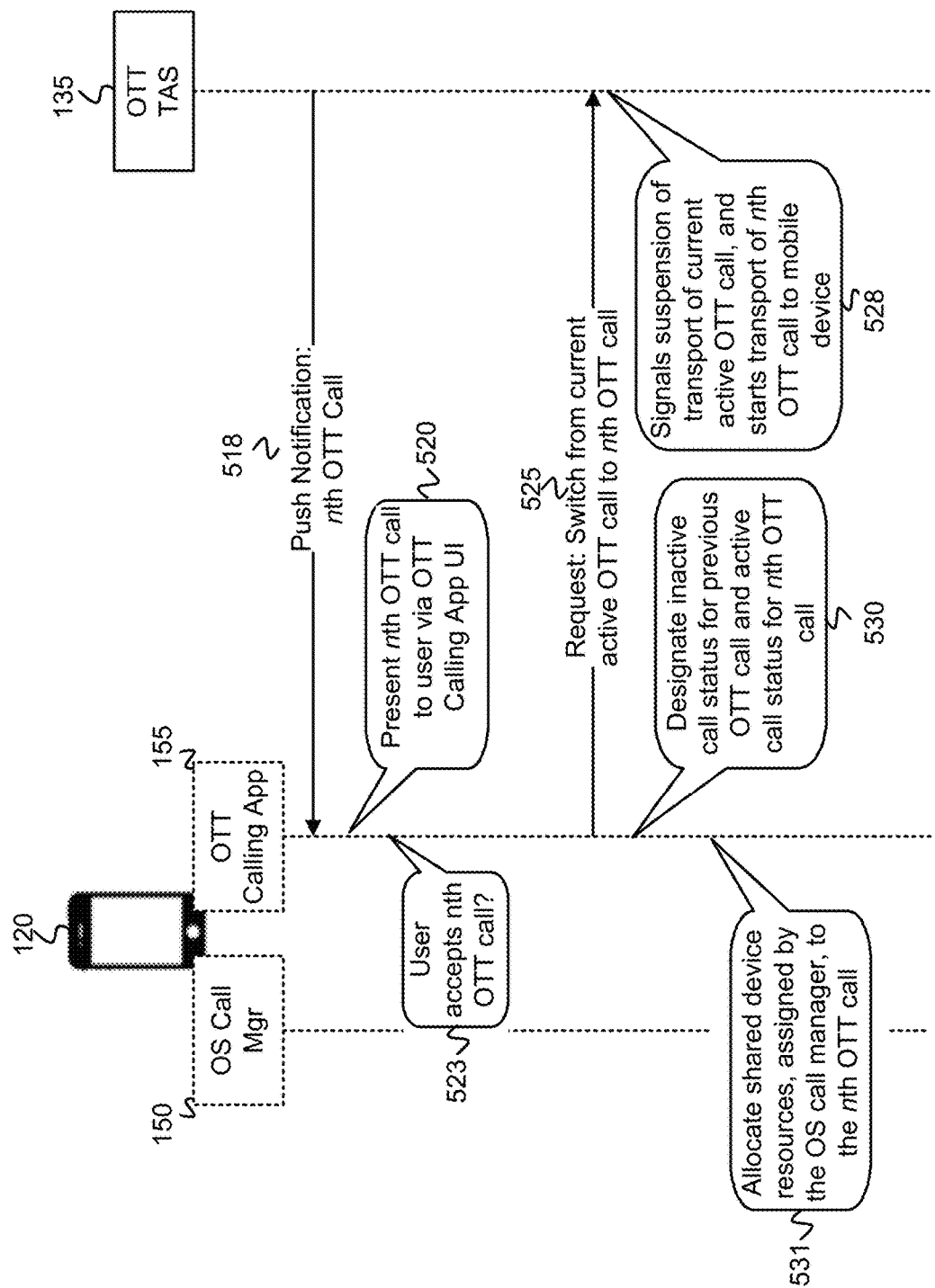
Figure 7B:
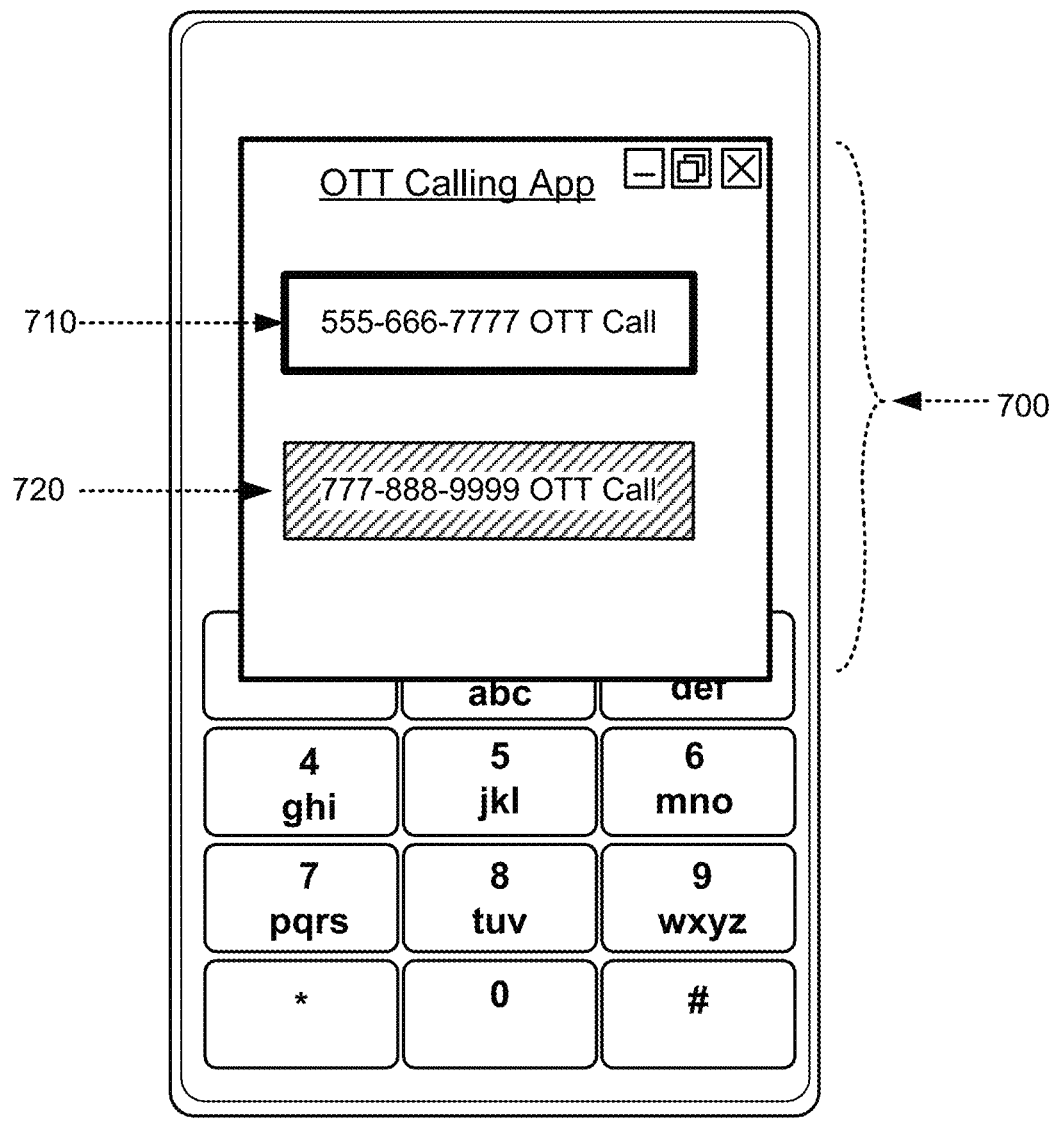

Referring to FIG. 4B, OTT calling app 155 at called mobile device 120 receives a push notification for an nth OTT call, where n is greater than or equal to two (block 423). In the first iteration of blocks 423 through 460, subsequent to the first OTT call, the nth OTT call would be the second OTT call. Blocks 423 through 460 of FIGS. 4B and 4C, however, may be executed in parallel for every subsequent nth OTT call received at called mobile device 120. The nth OTT call, therefore, may include the second OTT call, the third OTT call, the fourth OTT call, etc. FIG. 5B depicts a push notification 518 being sent from OTT TAS 135 to OTT calling app 155 at mobile device 120. OTT calling app 155 at called mobile device 120 presents the nth OTT call to the user via the OTT calling app user interface (block 425). FIG. 7B depicts the nth OTT call being presented as a highlighted icon 720 within OTT calling app user interface 700, where highlighted icon 720 includes a descriptor for the nth OTT call (e.g., an originating telephone number) and a visual indication that the call is awaiting acceptance (e.g., bright red). FIG. 5B depicts OTT calling app 155 presenting 520 the nth OTT call to the user via the OTT calling app user interface.

OTT calling app 155 at called mobile device 120 determines if the user accepts the nth call (block 428). Various techniques may be used by the user at mobile device 120 to accept the nth OTT call including, for example, touching the highlighted icon 720, shown in FIG. 7B. Other techniques or inputs, however, may alternatively be used for determining if the user of mobile device 120 accepts the incoming nth OTT call. If the user does not accept the nth OTT call (NO—block 428), then OTT calling app 155 maintains the current call status of active and inactive OTT calls (block 430). If the user accepts the nth call (YES—block 428), then OTT calling app 155 sends a request to OTT TAS 135 to switch from the current active OTT call to the nth OTT call (block 433). FIG. 5B depicts OTT calling app 155 determining 523 if the user accepts the nth OTT call, and sending a request message 525 to OTT TAS 135 requesting OTT TAS 135 to switch from the current active OTT call to the nth OTT call.

Upon receipt of the request from OTT calling app 155, OTT TAS 135 signals the suspension of the transport of the current OTT call and starting transport of the nth OTT call to the called mobile device 120 (block 435). OTT TAS 135 may, for example, signal, via signaling network 105 and transport network 115, OTT transport server 145 to suspend transport of the current OTT call and to begin transporting the nth OTT call to mobile device 120. FIG. 5B depicts OTT TAS 135 engaging in signaling 528 the suspension of transport of the currently active OTT call, and starting the transport of the nth OTT call to mobile device 120.

Figure 7C:
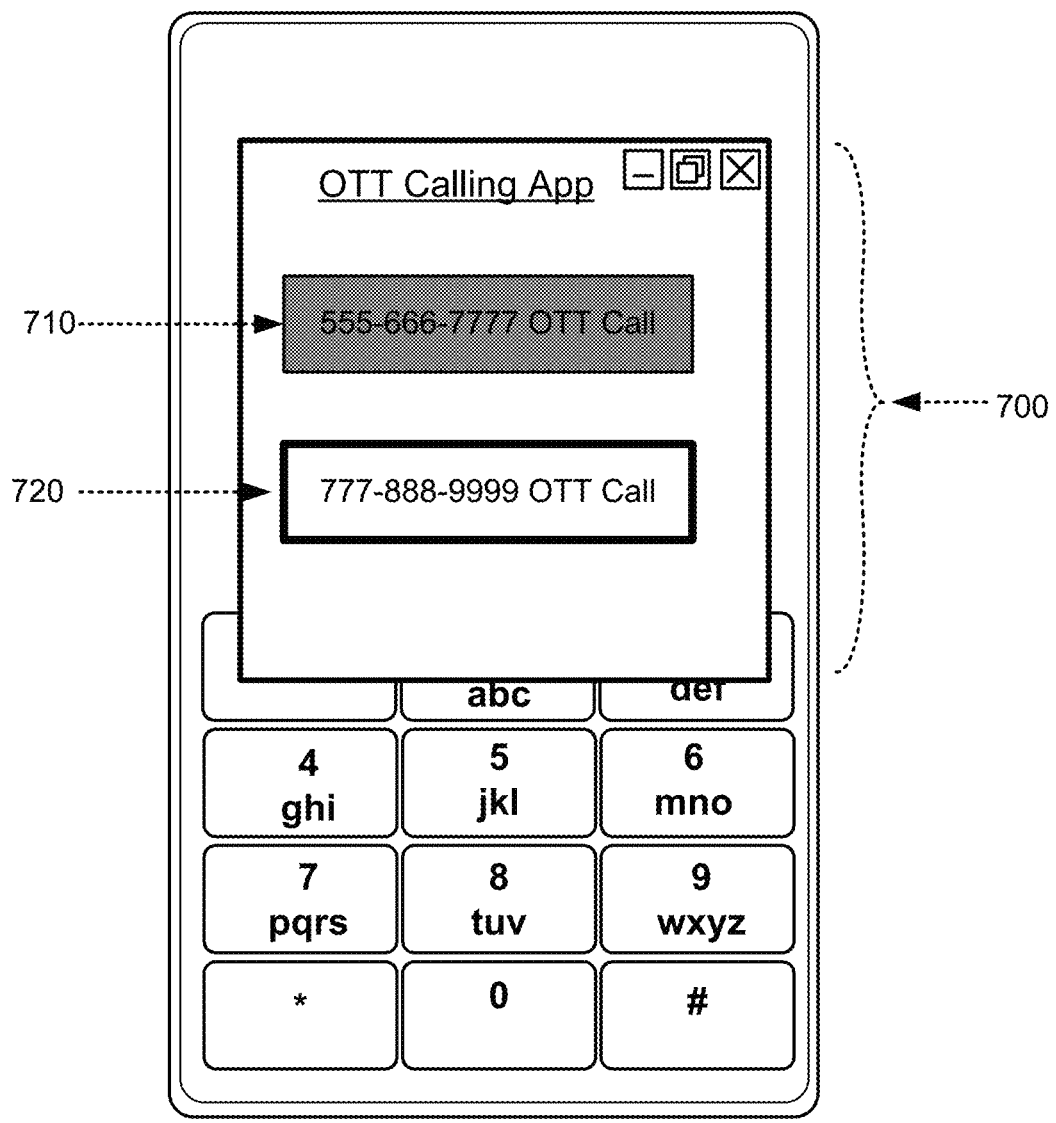

OTT calling app 155 designates an inactive call status for the previous OTT call, and an active call status for the nth OTT call (block 438). As shown in FIG. 7C, icon 710 for the 1st OTT call may be changed, for example, to a darkened, inactive state, and icon 720 for the nth OTT call may be changed, for example, to a highlighted state. The highlighted state may include, for example, a blinking icon 720, icon 720 having a color that stands out from other objects displayed in the OTT calling app user interface or the OS user interface, or icon 720 scrolling, rotating, or providing some other indication within the user interface that the first OTT call has changed to an inactive call status. FIG. 5B depicts OTT calling app 155 designating 530 an inactive call status for the previous OTT call and an active call status for the nth OTT call. OTT calling app 155 allocates the shared device resources, assigned by the OS call manager 150, to the nth OTT call (block 440). OS call manager 150 previously assigned the shared device resources to the active OTT call. OTT calling app 155 merely transfers this assignment to the nth OTT call to allocate the shared device resources. FIG. 5B depicts OTT calling app 155 allocating 531 the shared device resources, previously assigned by the OS call manager to the previous OTT call, to the nth OTT call.

Figure 5C:
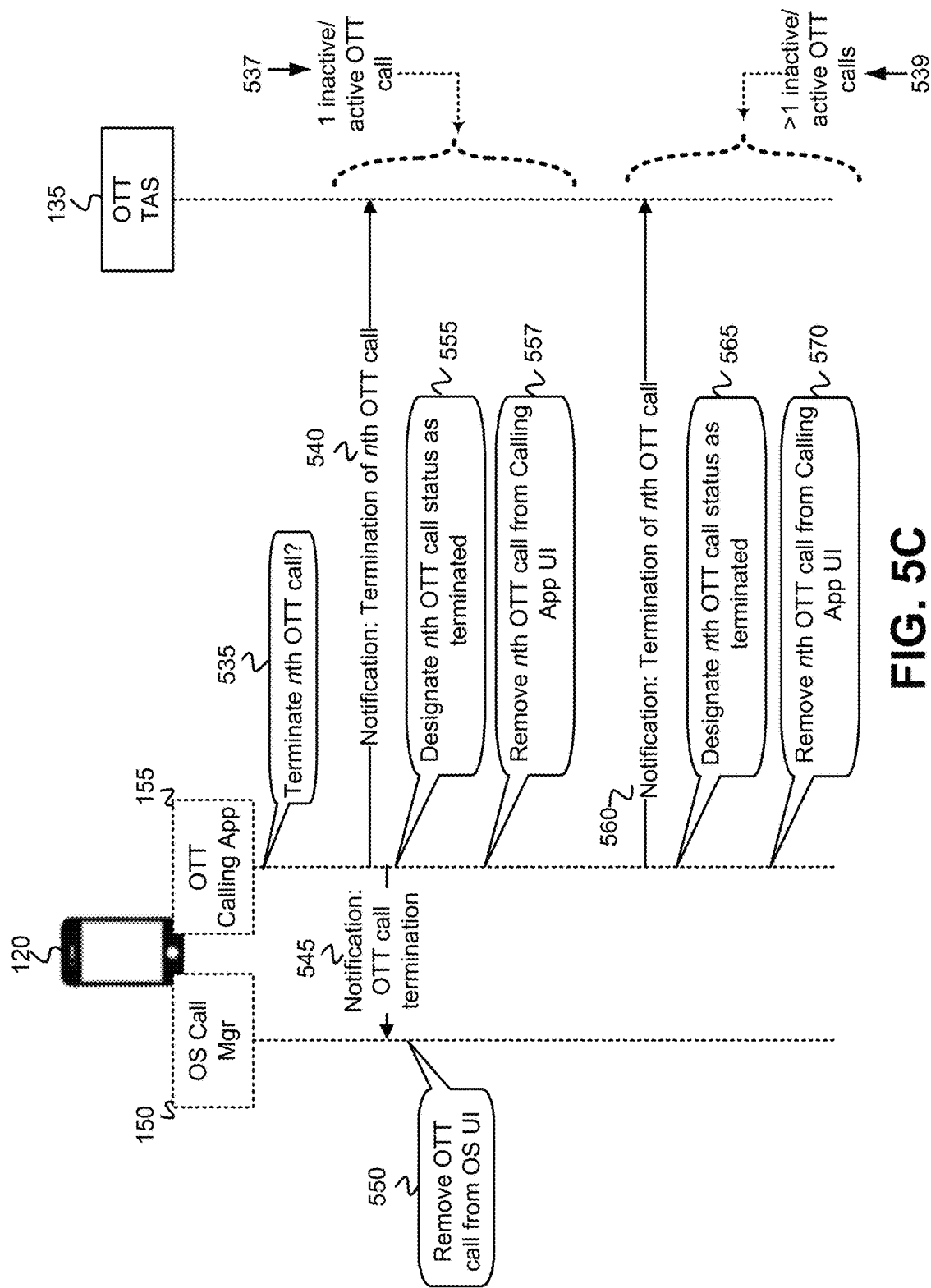

Referring to FIG. 4C, OTT calling app 155 determines if the nth OTT call is to be terminated (block 443). For example, the nth call may be terminated by the receipt of signaling that the OTT call has been terminated on the calling end. Alternatively, the nth call may be terminated by the user of called mobile device 120 providing an indication that the call is being terminated. For example, the user of mobile device 120 may touch the "end call" button upon the OTT calling app user interface. FIG. 5C depicts OTT calling app 155 at called mobile device 120 determining whether the nth OTT call is to be terminated. If the nth OTT call is not to be terminated (NO—block 443), then block 443 may repeat continuously until the OTT call is terminated. If the nth OTT call is to be terminated (YES—block 443), then OTT calling app 155 may determine if there is currently a single OTT call that is active or inactive (block 445). The processing/messaging associated with a determination that there is only a single OTT call that is active/inactive is depicted at 537 in FIG. 5C. The processing/messaging associated with a determination that there is more than a single OTT call that is active/inactive is depicted at 539 in FIG. 5C.

If there is only a single OTT call active or inactive (YES—block 445), then OTT calling app 155 sends a message to OTT TAS 135 indicating the termination of the nth OTT call (block 448). OTT calling app 155 may send a message to OTT TAS 135 via mobile network 110 and signaling network 105. FIG. 5C depicts OTT calling app 155 sending a notification message 540 that notifies OTT TAS 135 of the termination of the nth OTT call. OTT calling app 155 notifies OS call manager 150 of the OTT call termination (block 450), and OS call manager 150 removes the OTT call from the OS user interface based on receipt of the notification from OTT calling app 155 (block 455). FIG. 5C depicts OTT calling app 155 sending a notification 545 to OS call manager 150 indicating the OTT call termination, and OS call manager 150, upon receipt of the notification 545, removing 550 the OTT call from the OS user interface. OTT calling app 155 designates the nth OTT call status as "terminated" and removes the nth OTT call from the OTT calling app 155's user interface (block 460). Referring back to FIG. 7C, OTT calling app 155 may remove icon 720 from OTT calling app user interface 700. FIG. 5C depicts OTT calling app 155 designating 555 the nth OTT call status as terminated and removing 557 the nth OTT call from the OTT calling app user interface.

Referring to FIG. 4C, if there is more than a single OTT call that is active or inactive (NO—block 445), then OTT calling app 155 sends a message to OTT TAS 135 indicating the termination of the nth OTT call (block 465). OTT calling app 155 may send a message to OTT TAS 135 via mobile network 110 and signaling network 105. FIG. 5C depicts OTT calling app 535 sending a notification message 560 that notifies OTT TAS 135 of the termination of the nth OTT call.

OTT calling app 155 designates the nth OTT call status as "terminated" and removes the nth OTT call from the OTT calling app 155's user interface (block 470). Referring again to FIG. 7C, OTT calling app 155 may remove icon 720 from OTT calling app user interface 700. FIG. 5C depicts OTT calling app 155 designating 565 the nth OTT call status as terminated and removing 470 the nth OTT call from the OTT calling app user interface.

Figure 8:
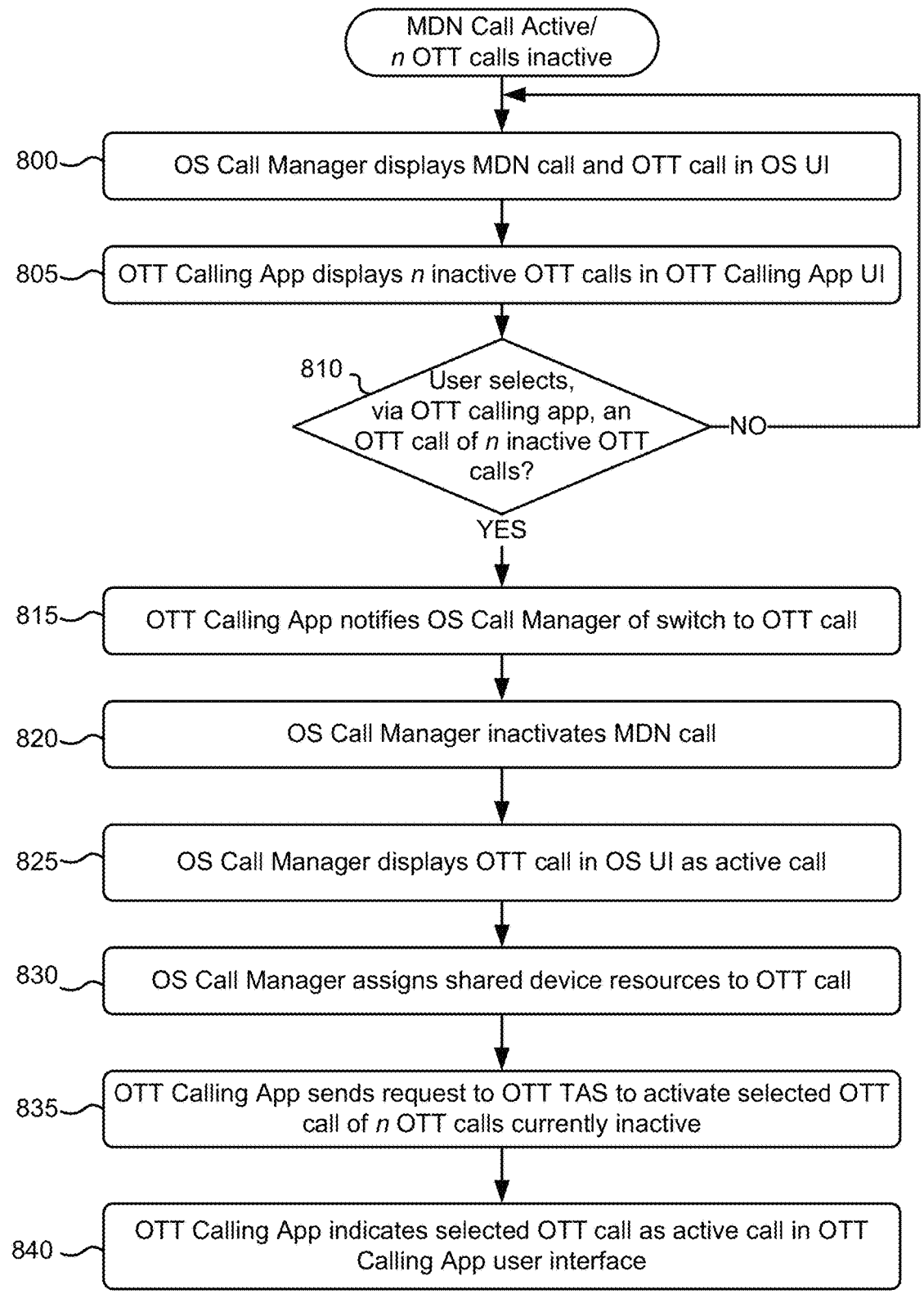
FIG. 8 is a flow diagram illustrating an exemplary process for switching from a mobile directory number call at called mobile device to an OTT call of n inactive OTT calls.

FIG. 8 is a flow diagram illustrating an exemplary process for switching from an MDN call at called mobile device 120 to an OTT call of n inactive OTT calls. The exemplary process of FIG. 8 may be performed by processing unit 320 (e.g., executing OS call manager 150 and OTT calling app 155) and communication interface(s) 380 of called mobile device 120 in conjunction with OTT TAS 135. The exemplary process of FIG. 8 is described herein with reference to the messaging diagrams of FIG. 9. Prior to the start of the exemplary process of FIG. 8, an MDN call is active and n OTT calls are inactive, where n is greater than or equal to two. For example, a user of called mobile device 120 is engaged in a MDN call, and n OTT calls are on-hold.

Figure 9:
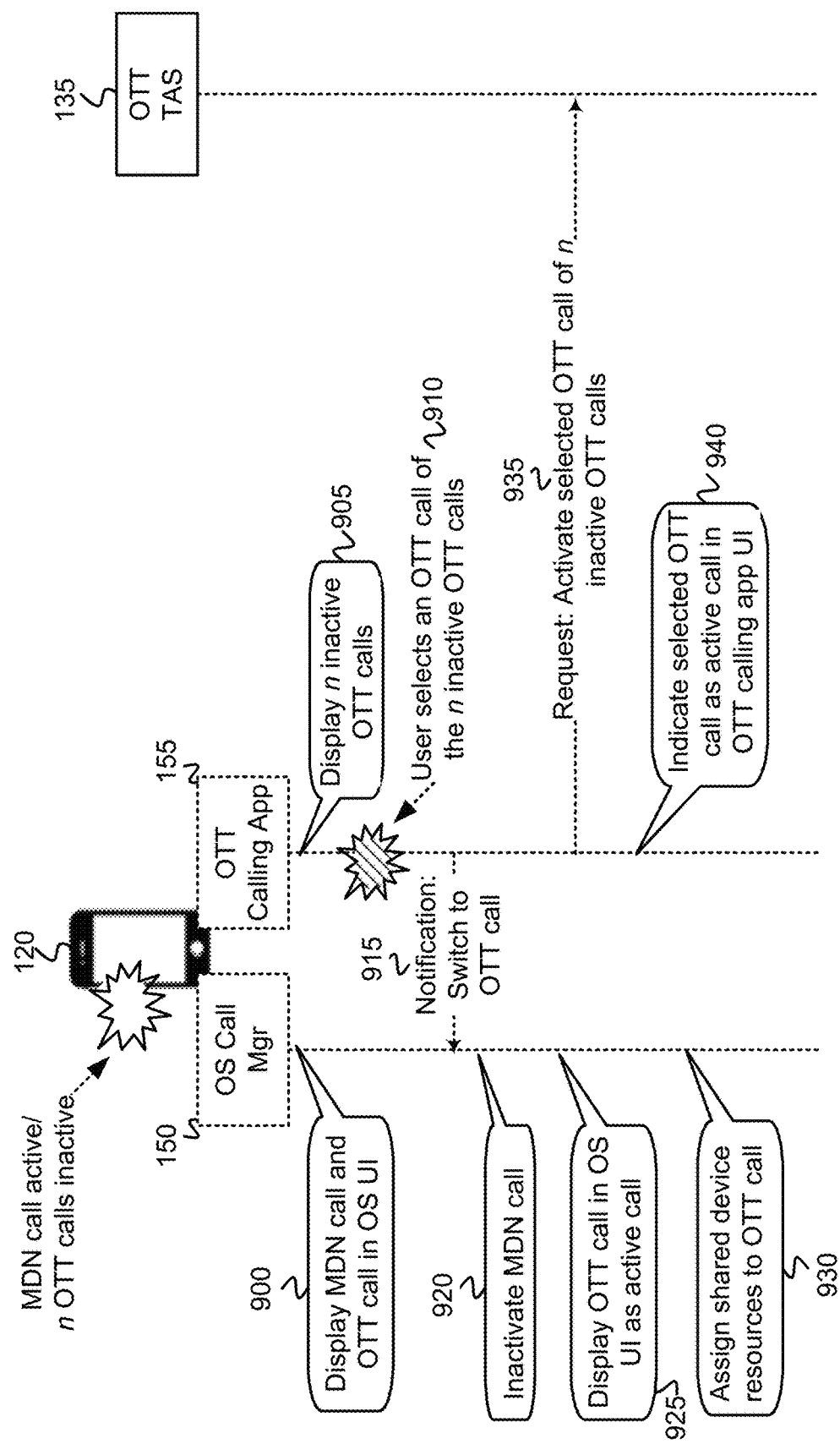
FIG. 9 is an exemplary messaging diagram associated with the exemplary process of FIG. 8.

The exemplary process may include OS call manager 150 displaying the active MDN call and an inactive OTT call in the OS user interface (block 800). For example, instead of the call statuses shown in FIG. 6, icon 610 may be highlighted as an active call, and icon 605 may be de-highlighted (e.g., darkened) as an inactive call. FIG. 9 depicts OS call manager 150 of called mobile device 120 displaying 900 a MDN call and OTT call in the OS user interface.

OTT calling app 155 displays n inactive OTT calls in the OTT calling app user interface, where n is greater than or equal to two (block 805). For example, instead of the display shown in FIG. 7B, icons 710 and 720 of OTT calling app user interface 700 may be de-highlighted (e.g., darkened) to indicate that the calls are inactive. FIG. 9 depicts OTT calling app 155 displaying 905 the n inactive OTT calls in the OTT calling app user interface. OTT calling app 155 determines if the user of mobile device 120 selects an OTT call of then inactive OTT calls (block 810). Various techniques may be used by the user at mobile device 120 to select an OTT call of the n inactive calls including, for example, the user touching an icon 710 or 720 of OTT calling app user interface 700, shown in FIG. 7B. Other techniques or inputs, however, may alternatively be used for determining if the user of mobile device 120 selects an OTT call of then inactive calls. If the user does not select an OTT call (NO—block 810), the exemplary process returns to block 800. If OTT calling app 155 determines that the user has selected an OTT call of the n inactive OTT calls (YES—block 810), then OTT calling app 155 notifies the OS call manager 150 of a switch to the OTT call from the active MDN call (block 815). FIG. 9 depicts user selection 910 of an OTT call of then inactive OTT calls, and OTT calling app 155, based on the user selection, sending a notification 915 to OS call manager 150 that indicates a switch from the MDN call to the selected OTT call.

OS call manager 150 inactivates the MDN call (block 820) and displays the OTT call in the OS user interface as the active call (block 825). For example, instead of the call statuses shown in FIG. 6, icon 610 may be de-highlighted (e.g., darkened) as an inactive call, and icon 605 may be highlighted as an active call. FIG. 9 depicts OS call manager 150 inactivating 920 the MDN call, and displaying 925 the OTT call in the OS user interface as the active call.

OS call manager 150 assigns shared device resources to the OTT call (block 830). The shared device resources of mobile device 120 may include the speaker(s), microphone(s), camera(s), and/or touch screen display of mobile device 120. The shared device resources of mobile device 120 may additionally other resources (e.g., communication interface) not described above. Assignment of the shared device resources to the OTT call may, for example, preclude any MDN call from using the assigned shared device resources. FIG. 9 depicts OS call manager 150 assigning 930 the shared device resources of mobile device 120 to the OTT call.

OTT calling app 155 sends a request to OTT TAS 135 to activate the selected OTT call of the n OTT calls that are currently inactive (block 835). Upon receipt of the request to activate the selected OTT call, OTT TAS 135 may, for example, signal, via signaling network 105 and transport network 115, OTT transport server 145 to resume transport of the selected OTT call to mobile device 120. OTT transport server 145, upon receipt of the signaling from OTT TAS 135, resumes the inactivated (e.g., on-hold) OTT call by transmitting OTT traffic associated with the OTT call between device 125/130 and mobile device 120. FIG. 9 depicts OTT calling app 155 sending a request 935 that requests that the user selected OTT call of the n inactive OTT calls be activated. OTT calling app 155 indicates the selected OTT call as the active call in the OTT calling app user interface (block 840). For example, instead of the call statuses shown in FIG. 7B, icon 720 may be highlighted as an active call, and icon 720 may be de-highlighted (e.g., darkened) as an inactive call. FIG. 9 depicts OTT calling app 155 indicating 940 the selected OTT call as the active call in the OTT calling app user interface.

Figure 10:
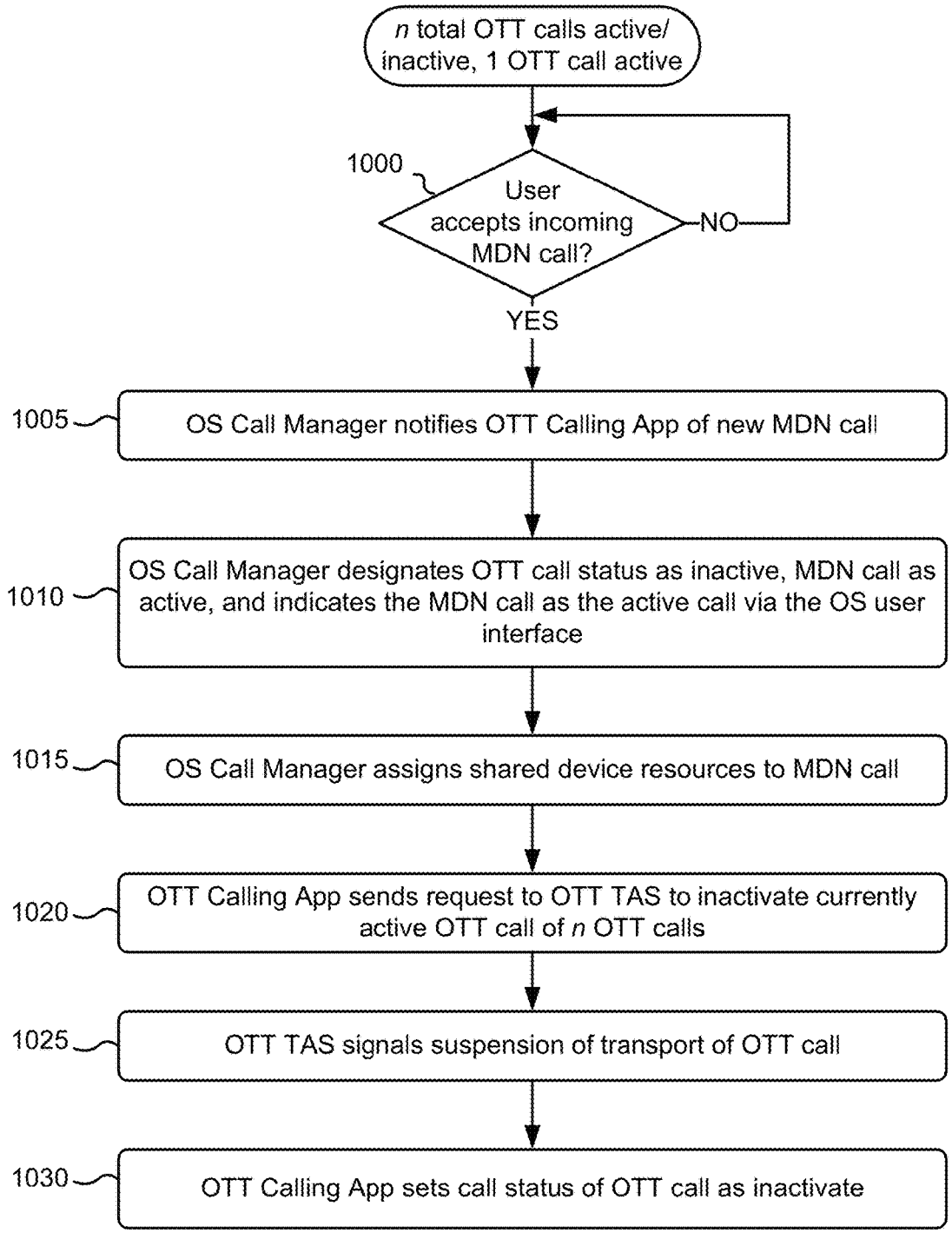
FIG. 10 is a flow diagram illustrating an exemplary process for managing an incoming mobile directory number call at a called mobile device when there are already n active or inactive OTT calls at the called mobile device.

FIG. 10 is a flow diagram illustrating an exemplary process for managing an incoming MDN call at called mobile device 120 when there are already n active or inactive OTT calls at mobile device 120. The exemplary process of FIG. 10 may be performed by processing unit 320 (e.g., executing OS call manager 150 and OTT calling app 155) and communication interface(s) 380 of called mobile device 120 in conjunction with OTT TAS 135. The exemplary process of FIG. 10 is described herein with reference to the messaging diagram of FIG. 11. Prior to the start of the exemplary process of FIG. 10, n OTT calls, where n is greater than or equal to two, are already active or inactive at called mobile device 120. For example, a user of called mobile device 120 may be engaged in an OTT call, and have at least one other OTT call on-hold, when an incoming MDN call occurs.

Figure 11:
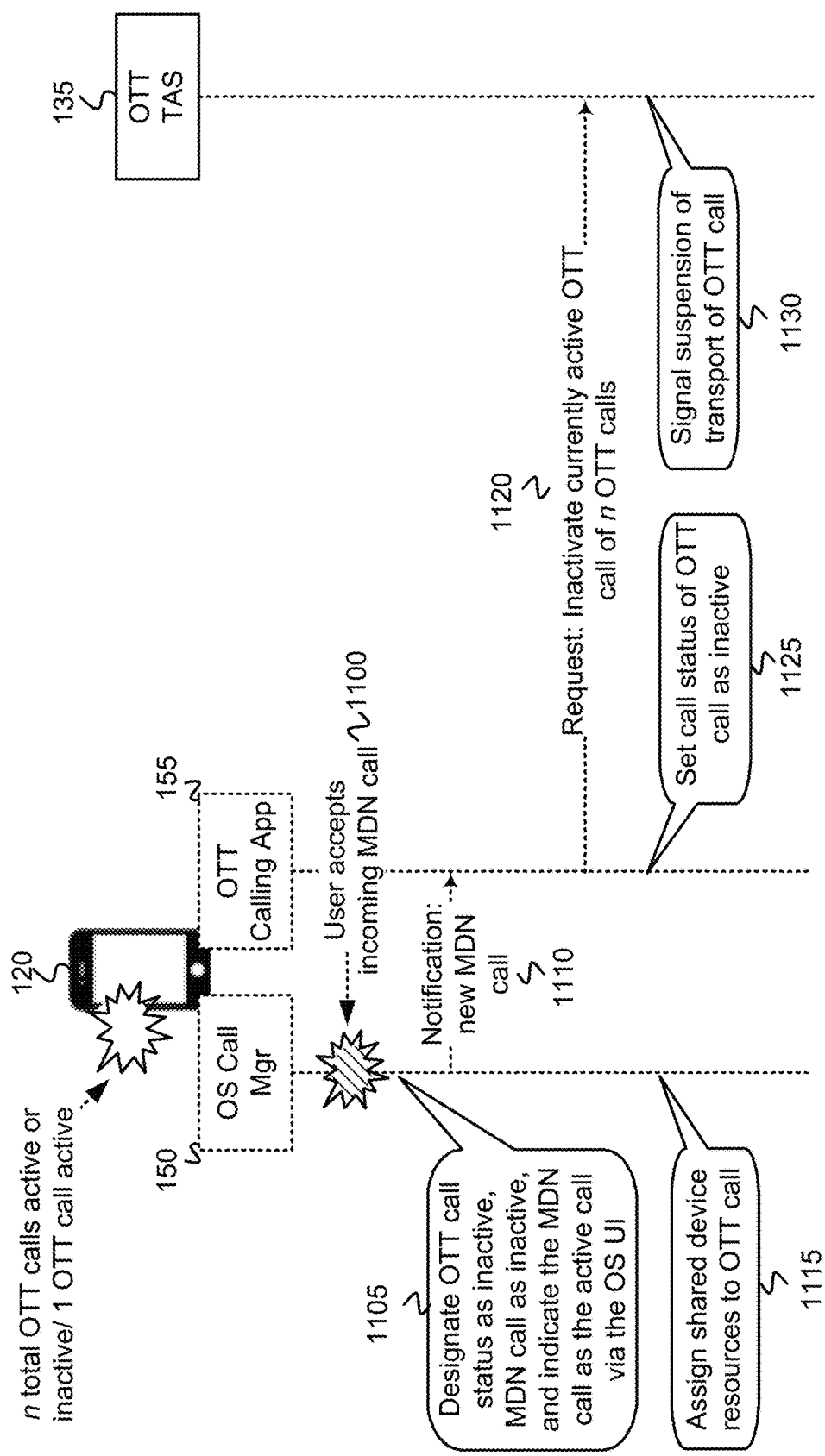
FIG. 11 is an exemplary messaging diagram associated with the exemplary process of FIG. 10.

The exemplary process may include OS call manager 150 determining if the user of called mobile device 120 has accepted an incoming MDN call (block 1000). Various techniques may be used by the user at mobile device 120 to accept the incoming MDN call including, for example, pressing an "answer" button upon a touch screen of the OS user interface of mobile device 120, shaking mobile device 120 to cause the MDN call to be answered, or performing a sliding motion upon a button of the touch screen of the OS user interface of mobile device 120 to cause the MDN call to be answered. Other techniques or inputs may be used for determining if the user of mobile device 120 accepts the incoming MDN call. If the user has accepted an incoming MDN call (YES—block 1000), then OS call manager 150 notifies OTT calling app 155 of the new MDN call (block 1005). FIG. 11 depicts a user accepting 1100 an incoming MDN call, and OSS call manager 150, based on acceptance of the MDN call, sending a notification 1110 to OTT calling app 155 indicating the new incoming MDN call.

OS call manager 150 designates the OTT call status as inactive, the MDN call as active, and indicates the MDN call as the active call via the OS user interface (block 1010). For example, instead of the call statuses shown in FIG. 6, icon 605 for the OTT call may be de-highlighted (e.g., darkened) as an inactive call, and icon 605 for the MDN call may be highlighted as an active call. FIG. 11 depicts OS call manager 150 designating 1105 the OTT call status as inactive, the MDN call as inactive, and indicating the MDN call as the active call via the OS user interface.

OS call manager 150 assigns shared device resources to the MDN call (block 1015). The shared device resources of mobile device 120 may include the speaker(s), microphone(s), camera(s), and/or touch screen display of mobile device 120. The shared device resources of mobile device 120 may additionally other resources (e.g., communication interface) not described above. Assignment of the shared device resources to the MDN call may, for example, temporarily preclude any OTT call from using the assigned shared device resources. FIG. 11 depicts OS call manager 150 assigning 1115 the shared device resources to the OTT call.

OTT calling app 155 sends a request to OTT TAS 135 to inactivate the currently active OTT call of then OTT calls (block 1020). FIG. 11 depicts OTT calling app 155 sending a request message 1120 that requests the inactivation of the currently active OTT call of n OTT calls. OTT TAS 135 signals the suspension of transport of the OTT call (block 1025).

Upon receipt of the request to inactivate the currently active OTT call of the n OTT calls, OTT TAS 135 may, for example, signal, via signaling network 105 and transport network 115, OTT transport server 145 to suspend transport of OTT traffic, associated with the currently active OTT call, to mobile device 120. OTT transport server 145, upon receipt of the signaling from OTT TAS 135, suspends the OTT call (e.g., places on hold) by temporarily stopping the transmission of OTT traffic associated with the OTT call between device 125/130 and mobile device 120. FIG. 11 depicts OTT TAS 135 signaling the suspension of transport of the OTT call.

OTT calling app 155 sets the call status of the OTT call as inactive (block 1030). For example, similar to the call status associated with icon 710 shown in FIG. 7B, the icon of the OTT call may be de-highlighted (e.g., darkened) as an inactive call within OTT call app user interface 700. FIG. 11 depicts OTT calling app 155 setting 1125 the call status of the OTT call as inactive.

The foregoing description of implementations provides illustration and description, but is not intended to be exhaustive or to limit the invention to the precise form disclosed. Modifications and variations are possible in light of the above teachings or may be acquired from practice of the invention. For example, while series of blocks have been described with respect to FIGS. 4A-4C, 8, and 10, and message/activity flows with respect to FIGS. 5A-5C, 9, and 11, the order of the blocks and/or message/activity flows may be varied in other implementations. Moreover, non-dependent blocks may be performed in parallel.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and the type of information. Storage and use of personal information may be in an appropriately secure manner reflective of the type of information, for example, through various encryption and anonymization techniques for particularly sensitive information.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
executing, at a mobile device, an operating system (OS) call manager and an over-the-top (OTT) calling application (app);
receiving, at the OTT calling app, a notification for a first OTT call;
sending, by the OTT calling app, an internal notification to the OS call manager, wherein the internal notification notifies the OS call manager of the first OTT call;
assigning, by the OS call manager, shared device resources of the mobile device to the first OTT call;
receiving, at the OTT calling app, a notification for a second OTT call;
sending, from the OTT calling app to an OTT Telephony Application Server (TAS) without notifying the OS call manager of the second OTT call, a request to switch from the first OTT call to the second OTT call;
identifying, by the OTT calling app, the first OTT call as inactive and the second OTT call as active; and
allocating, by the OTT calling app, the shared device resources assigned to the first OTT call, to the second OTT call.

2. The method of claim 1, wherein the first OTT call comprises a Voice over Internet Protocol (VoIP) call.

3. The method of claim 1, wherein the OS call manager comprises operating system software that manages incoming and outgoing calls, including calls to and from a Mobile Directory Number (MDN) associated with the mobile device and including incoming and outgoing OTT calls.

4. The method of claim 1, wherein the shared device resources comprise a speaker and a microphone of the mobile device.

5. The method of claim 1, further comprising:
designating, by the OS call manager if the first OTT call is accepted by a user of the mobile device, the first OTT call as active; and
inactivating any active Mobile Directory Number (MDN) calls.

6. The method of claim 1, wherein the OS call manager, if the second OTT call is accepted by a user of the mobile device, does not change any call statuses due to the OTT calling app not notifying the OS call manager of the second OTT call.

7. The method of claim 1, further comprising:
placing, by the OTT calling app, the first OTT call on hold subsequent to identifying the first OTT call as inactive.

8. The method of claim 1, further comprising:
determining, by the OTT calling app, if the second OTT call has ended;
sending, by the OTT calling app to the OTT TAS, a message indicating termination of the second OTT call;
designating, by the OTT calling app, the second OTT call status as terminated; and
removing the second OTT call from the OTT calling app user interface.

9. A mobile device, comprising:
one or more communication interfaces; and
a processing unit configured to execute an operating system (OS) call manager and an over-the-top (OTT) calling application (app) and further configured to:
receive, via the one or more communication interfaces by the OTT calling app, a notification for a first OTT call,
send, by the OTT calling app, an internal notification to the OS call manager, wherein the internal notification notifies the OS call manager of the first OTT call,
assign, by the OS call manager, shared device resources of the mobile device to the first OTT call,
receive, via the one or more communication interfaces by the OTT calling app, a notification for a second OTT call,
send, via the one or more communication interfaces, from the OTT calling app to an OTT Telephony Application Server (TAS) without notifying the OS call manager of the second OTT call, a request to switch from the first OTT call to the second OTT call,
identify, by the OTT calling app, the first OTT call as inactive and the second OTT call as active, and
allocate, by the OTT calling app, the shared device resources assigned to the first OTT call, to the second OTT call.

10. The mobile device of claim 9, wherein the first OTT call comprises a Voice over Internet Protocol (VoIP) call.

11. The mobile device of claim 9, wherein the OS call manager comprises operating system software that manages incoming and outgoing calls, including calls to and from a Mobile Directory Number (MDN) associated with the mobile device and including incoming and outgoing OTT calls.

12. The mobile device of claim 9, wherein the shared device resources comprise a speaker and a microphone of the mobile device.

13. The mobile device of claim 9, wherein the processing unit is further configured to:
designate, by the OS call manager if the first OTT call is accepted by a user of the mobile device, the first OTT call as active, and
inactivate any active Mobile Directory Number (MDN) calls.

14. The mobile device of claim 9, wherein the OS call manager, if the second OTT call is accepted by a user of the mobile device, does not change any call statuses due to the OTT calling app not notifying the OS call manager of the second OTT call.

15. The mobile device of claim 9, wherein the processing unit is further configured to:
place, by the OTT calling app, the first OTT call on hold subsequent to identifying the first OTT call as inactive.

16. The mobile device of claim 9, wherein the processing unit is further configured to:

determine, by the OTT calling app, if the second OTT call has ended;

send, by the OTT calling app to the OTT TAS, a message indicating termination of the second OTT call;

designate, by the OTT calling app, the second OTT call status as terminated; and remove the second OTT call from the OTT calling app user interface.

17. A non-transitory storage medium storing instructions executable by a mobile device, wherein the instructions comprise instructions to cause the mobile device to:

execute an operating system (OS) call manager and an over-the-top (OTT) calling application (app);

receive, by the OTT calling app, a notification for an incoming first OTT call;

send, by the OTT calling app, an internal notification to the OS call manager, wherein the internal notification notifies the OS call manager of the first OTT call;

assign, by the OS call manager, shared device resources of the mobile device to the first OTT call;

receive, by the OTT calling app, a notification for an incoming second OTT call;

send, from the OTT calling app to an OTT Telephony Application Server (TAS) without notifying the OS call manager of the second OTT call, a request to switch from the first OTT call to a second OTT call;

identify, by the OTT calling app, the first OTT call as inactive and the second OTT call as active; and allocate, by the OTT calling app, the shared device resources assigned to the first OTT call, to the second OTT call.

18. The non-transitory storage medium of claim 17, wherein the first OTT call comprises a Voice over Internet Protocol (VoIP) call.

19. The non-transitory storage medium of claim 17, wherein the OS call manager comprises operating system software that manages incoming and outgoing calls, including calls to and from a Mobile Directory Number (MDN) associated with the mobile device and including incoming and outgoing OTT calls.

20. The non-transitory storage medium of claim 17, further comprising instructions to cause the mobile device to:

place, by the OTT calling app, the first OTT call on hold subsequent to identifying the first OTT call as inactive.

* * * * *